United States Patent [19]
Denne

[11] Patent Number: 4,978,299
[45] Date of Patent: Dec. 18, 1990

[54] SIMULATOR MECHANISM

[75] Inventor: Phillip R. M. Denne, Dorset, Great Britain

[73] Assignee: Super X Limited, Southampton, Great Britain

[21] Appl. No.: 469,491

[22] PCT Filed: Sep. 29, 1988

[86] PCT No.: PCT/GB88/00800
§ 371 Date: Apr. 12, 1990
§ 102(e) Date: Apr. 12, 1990

[87] PCT Pub. No.: WO89/03107
PCT Pub. Date: Apr. 6, 1989

[30] Foreign Application Priority Data
Sep. 29, 1987 [GB] United Kingdom ............... 8722853

[51] Int. Cl.$^5$ ............................................. G09B 9/06
[52] U.S. Cl. ..................................................... 434/58
[58] Field of Search ........................... 434/54, 58, 59; 272/1 B, 1 C, 28 R, 28 S, 53.1, 18, 97, 14 C

[56] References Cited

U.S. PATENT DOCUMENTS

| | | | |
|---|---|---|---|
| 1,789,680 | 1/1931 | Gwinnett | 272/18 |
| 3,967,387 | 7/1976 | Marchegiani | 434/58 |
| 4,509,743 | 4/1985 | Lie | 272/146 |
| 4,749,180 | 7/1988 | Boomer | 272/1 B |
| 4,838,540 | 6/1989 | Ouellet | 272/97 |
| 4,850,588 | 7/1989 | Desjardins et al. | 272/97 |

FOREIGN PATENT DOCUMENTS

| | | |
|---|---|---|
| 2184182 | 12/1973 | France . |
| 1350941 | 4/1974 | United Kingdom . |
| 2068322 | 8/1981 | United Kingdom . |

Primary Examiner—Richard J. Apley
Assistant Examiner—Glenn E. Richman

[57] ABSTRACT

A simulator mechanism capable of operating in three degrees of freedom is described comprising a base (14) having a fixed plane, a simulator plane (12) and three independent extendible actuators (16, 18 and 20) capable of changing the simulator operating plane, three actuators (16, 18 and 20) being pivotally coupled with universal freedom at or around, a substantially single point (C), each actuator (16, 18 and 20) being pivotally coupled to points (J, E, and F) on the simulator plane (12), each point (J, E and F) being spaced apart from the other actuator coupling points on the same plane A restrainer means is provided to prevent motion in the yaw, surge and sway axes.

8 Claims, 5 Drawing Sheets

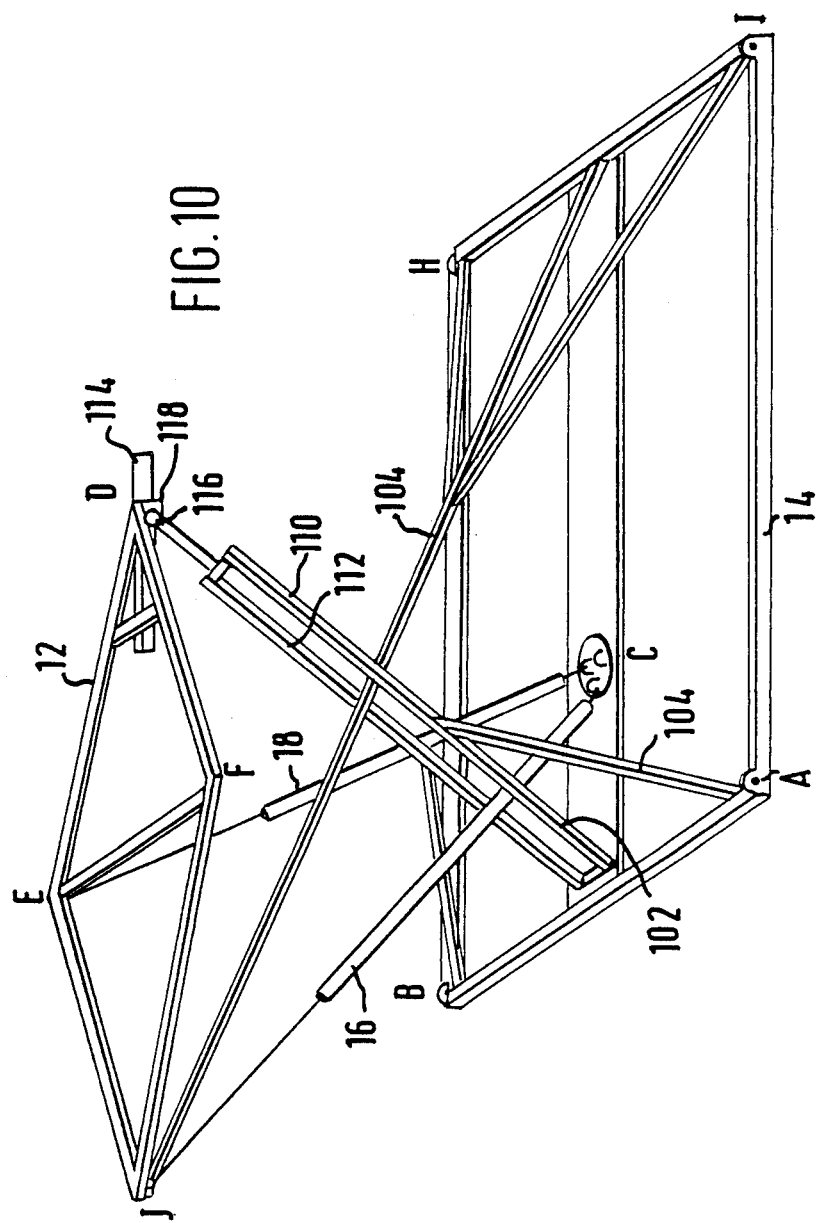

SIMULATOR MECHANISM

The present invention relates to simulator mechanism. In particular it relates to a simulator mechanism such as an aircraft simulator which operates in three degrees of freedom e.g. heave, pitch and roll. The mechanism may be used to simulate movement of types of vehicle such as a car, boat, space craft, skis etc. as desired.

GB No. 2068322 discloses a motion system providing three or four degrees of freedom for a flight simulator. However, the problem with such a system is that the extendible members are mounted on a base apart from one another. Any stresses set up between the extendible members are transmitted from one to another through the base.

U.S. Pat. No. 3,967,387 discloses a motion simulator of a rather complicated nature operating in four, five and six degrees of freedom. GB No. 1187857 operates in several degrees of freedom but requires two separate support and operating mechanisms to do so.

According to the present invention there is provided a simulator mechanism capable of operating in three degrees of freedom, including a base having a fixed plane, a simulator operating plane and three independent extendible actuators capable of changing the operating plane, characterized in that;

the three actuators are pivotally coupled with universal freedom at or around, a substantially single point on one of the planes;

and each actuator is pivotally coupled to a point on the other of the planes;

each point is spaced apart from the other actuator coupling points substantially coincident with the other plane.

It is preferred that the three actuators are pivotally coupled with universal freedom around substantially a single point on the base plane and that the spaced apart points are on the simulator operating plane.

The single point or substantially single point of coincidence may be above the base plane, on the base plain or below the base plane.

The simulator operating plane preferably includes a simulator capsule or other means to allow the operator of the simulator mechanism to be comfortably seated.

In a preferred embodiment the actuators are coupled to operate in heave, and about the pitch and roll axes and the mechanism has restraining means to prevent unwanted motion in yaw, surge and sway axes. The motion is not required in these axes because by this invention, it is possible to simplify the apparatus without losing the impression of motion in these directions.

The actuators are preferably hydraulic rams having extendible pistons.

However other types of actuators may also be used such as pneumatic pistons, electric actuators, rack and pinion operated by electric motors and ball and nut operating in a rotating screw rod.

The restraining means are preferably frames such as A frames or equivalents thereto e.g. rigid T or Y frames, referred to herein generally as A frames, to provide stiffness, the A frames being pivotally mounted at each apex of the frame. However other restraining means are contemplated such as a fixed post extending perpendicularly from the base plane such that a coupling in the form of a sliding bearing attached to the simulator capsule can slide vertically along the post. Other examples of restraining means are described below.

The purpose of the restraining mechanism surrounding the actuators is to allow the simulator mechanism to operate in the three degrees of freedom required i.e. the heave, pitch and roll axes but at the same time to control the system in the three uncontrolled axes which are the yaw, surge and sway axes. The principal forces between the plane on which the simulator is mounted i.e. the simulator operating plane and the fixed base plane are preferably not coupled through the simulator structure but are passed simply and directly through the actuators themselves. Forces transmitted by the linkages are therefore second order forces only. These are caused by the out of balance masses and inertia of the simulator capsule. The principle of the mechanism is to take the restraining forces out of the base to enable it to be made of a lighter construction and to prevent vibration and unnecessary stresses being passed through the base.

As indicated, the actuators are preferably hydraulic rams connected preferably through a single point or substantially a single point on the base plane. Connection through a single point as defined in the specification includes connection through a multiple mounting bracket to allow each of the actuators to be pivotally mounted without interfering with the other actuators during operation of the simulator. In order to overcome engineering problems in construction of the actuator of the present invention the hydraulic rams may be be mounted on a base plate such that the base plate forms the single point of connection.

The actuators are preferably pivotally coupled to the simulator operating plane at notional apexes of an equilateral triangle. It is further preferred that the equilateral triangle is so constructed that the distance between the centre of area of the triangle and each apex is shorter than the minimum length of the hydraulic ram when fully retracted. It is also preferred that the arrangement of the rams and equilateral triangle are such that the minimum parallel distance between the two planes causes the angle of the hydraulic ram and the base of be 20°.

The normal working action of the hydraulic ram would operate from a maximum extension which corresponds to an angle between the base and the ram of for example 60° and a minimum working extension corresponding to an angle of 30°. Such an arrangement allows the simulator to be lowered to its full extent so that the rams are collapsed too their minimum extension to enable occupants of the simulator capsule to enter the capsule. The capsule can then be raised to a safe clearance above the simulator operating plane by extending the rams to take them to a working or operating angle greater than 30° as mentioned above. During normal operation of the simulator capsule the movement of the rams is preferably such as to control the working angle of the rams between 30° and 60°.

Although the actuators are preferably the same length, this is not essesntial. One of the actuators may be of a different length to the others. Thus it is possible for the actuators to be pivotally coupled to the simulator capsule in the simulator operating plane in a triangular arrangement which is other than an equivalent triangle e.g. an isosceles triangle, as desired.

The present invention will be further described, by way of example only, with reference to the accompanying drawings, in which:

FIGS. 7-10 show alternative arrangements of restraining means with the actuators of the present invention.

Figure 1:
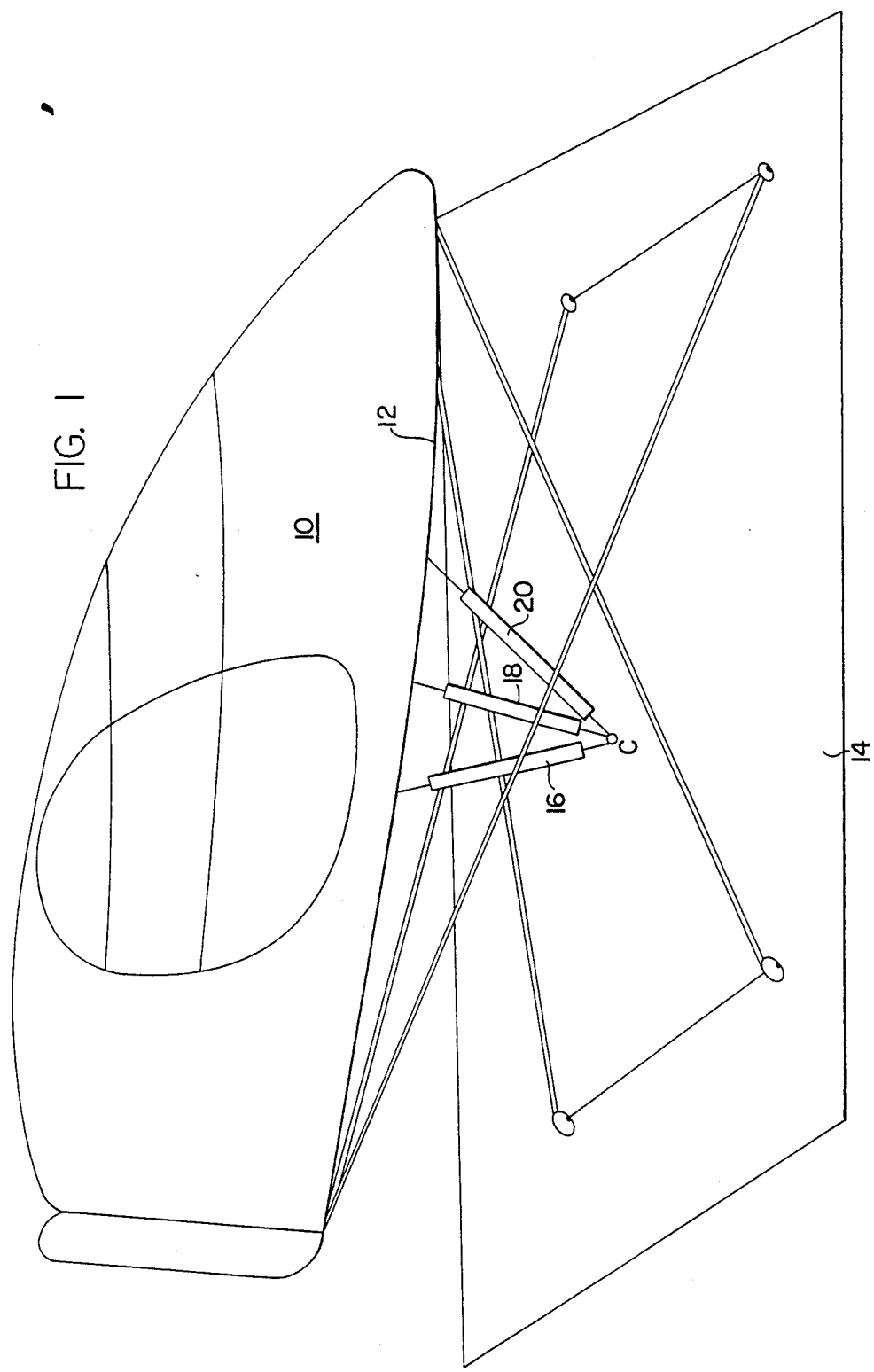
FIG. 1 shows a general arrangement of a simulator capsule according to the present invention.

Referring to FIG. 1, which shows a general arrangement of the simulator of the present invention, in this case in the form of an aircraft simulator, having a capsule 10 mounted on a simulator operating plane 12. The base plane 14 has a pivotal mounting point C from which extend three actuators 16 18 and 20. The actuators are preferably in the form of hydraulic rams each having hydraulic control pipes [not shown] to cause the ram to extend as required and according to the control means [not shown]. The pivotal point C couples the three actuators to the base plate 12 giving the coupling universal freedom to allow it to move in any axis required. The actuators 16, 18 and 20 are connected to the simulator operating plane and hence to the capsule simulator by means of further pivotal points to be described with reference to FIG. 2. It can be seen by adjusting the length of the actuators 16, 18 and 20 the capsule 10 can move in three degrees of freedom i.e. heave, pitch and roll. The arrangement of the actuators 16, 18 and 20 from a single pivotal point C to a notional equilateral triangle provides the minimum number of associated linkage arms and bearings by which the actuators may be linked from the base plane 14 to the simulator operating plane 12.

Figure 2:
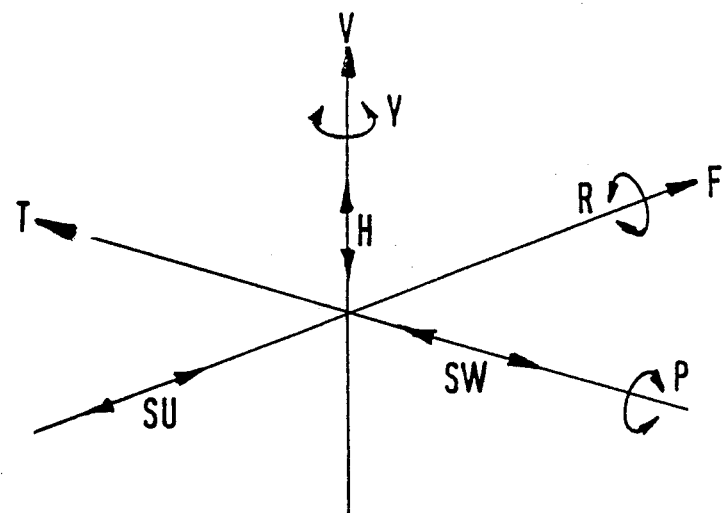
FIG. 2 illustrates the axes of the simulator capsule.

Referring to FIG. 2, this defines the axis of a simulator capsule. The surge axis is generally designated as F whilst the sway axis is generally designated as T. The heave axis at right angles to both the sway and surge axis, and is designated as V. Therefore, roll is designed as rotation R around the axis F, pitch is defined as rotation P around the axis T, yaw is defined as rotation Y around the axis V, surge is defined as the movement SU on the axis F, sway is defined as the movement SW along thee axis T and heave is defined as the movement H along the vertical axis V.

In order to prevent further degrees of freedom in three uncontrolled axes, yaw Y, surge SW, and sway SW, restraints are provided. As shown in FIG. 1, these are in the form of two intersecting A frames 22 and 24. A frame 22 extends from pivotal points A and B on the base plane 14 to a further pivotal point B on the simulator operating plane at the forward end of the capsule simulator. In the same way a further triangular A frame 24 extends from two pivotal points H and I on the base in the base plane 14 to a single pivotal point J on the simulator operating plane 12. By controlling the actuators 16, 18 and 20 the changing length of the actuators causes movement of the simulator capsule 10, the A frames restraining the capsule in the undesired yaw, surge, and sway axes.

Figure 3:
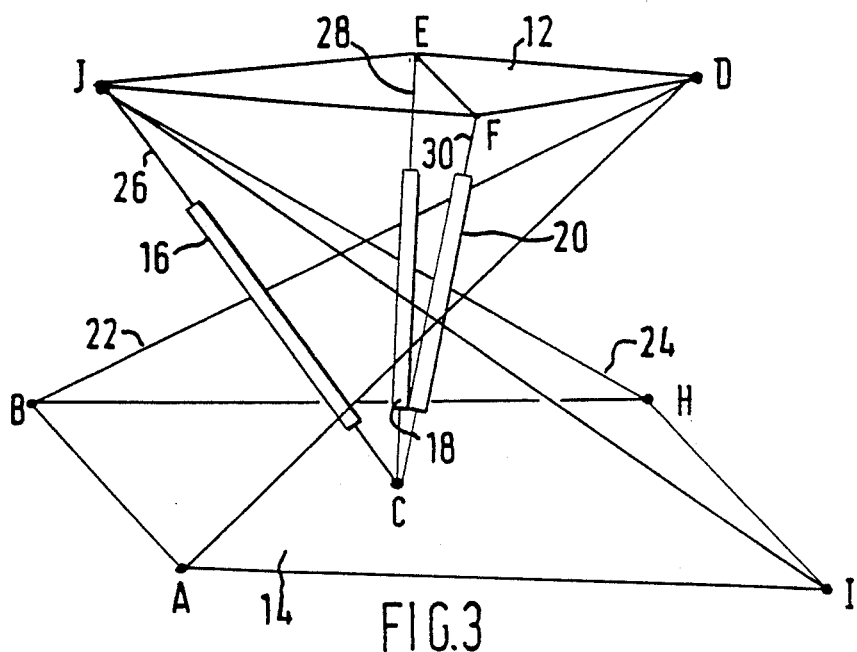
FIG. 3 shows a diagrammatic view of the arrangement of FIG. 1.

Referring to FIG. 3, which is a diagrammatic form of FIG. 1, the rectangle ABHI is set in the base plane 14. The figure DEFJ is set in the simulator operating plane 12. The actuators 16, 18 and 20 are mounted on a universal pivotal point C and extended to points EFJ on the simulator operating plane 12 connected through individual pivotal points E: F: and J: each having universal freedom. The actuators 16, 18 and 20 have extendible rams 26, 28 and 30 respectively. The frames 22 and 24 are formed by the triangles ABD and HIJ respectively. The triangle EFJ is preferably positioned around the centre of mass of the simulator capsule 10 as shown in FIG. 1 in order that the mass of the capsule is supported by the actuators. In FIG. 2 an equilateral triangle is shown although this is not essential. The actuator 16 extending from C to J may be longer than the other two actuators 18 and 20, for example. This means that the actuator 16 and its ram 26 would need to be longer than the actuators 18 and 20 and their respective rams 28 and 30. Point D or Point J, but not both, may be mounted on a sliding bearing as described in relation to FIG. 7 to take up unwanted surge.

Figure 4:
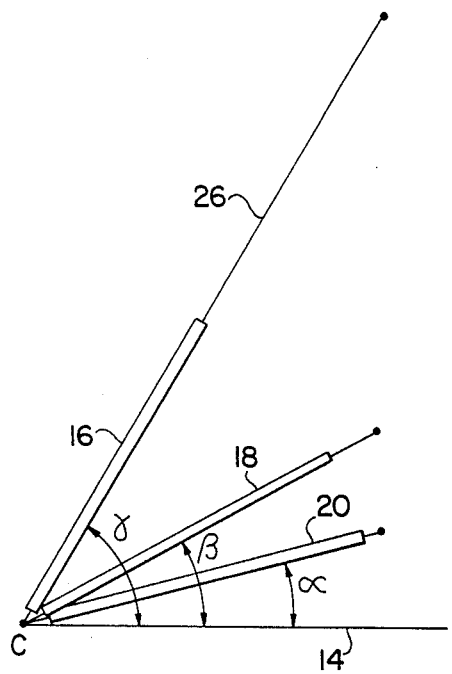
FIG. 4 shows the range of extension of the actuators.

However referring to the position where an equilateral triangel EFJ is formed, this is so constructed that the distance between the centre of area of the triangle and each apex E, F, and J is shorter than the minimum length of the ram when fully retracted. It is preferred that a dimension is used which allows the minimum parallel distance between the two planes to cause the angle between the hydraulic rams and the base areas to be an angle, preferably 20° when retracted. This is illustrated in FIG. 4 which also shows the working actions of a cylinder at a maximum extension of angle and angle which is a minimum working extension. The range of angles from the minimum working extension to the maximum angle would be 30° to 60°. This arrangement allows the simulator to be lowered to its full extent on collapsing of the actuators 16, 18 and 20 and is extended to provide a safe clearance above the base plane 14 at an operating angle grater than about 30°.

Figure 5:
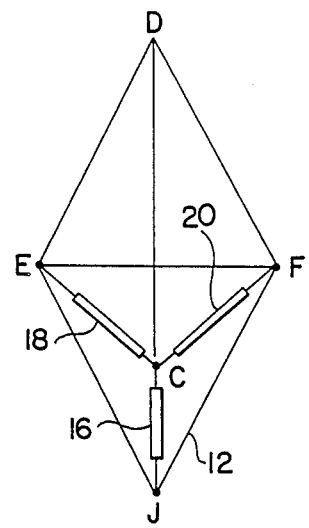
FIG. 5 shows the general arrangement of the actuators in one plane.

FIG. 5 shows the plan view of the arrangement of the present invention including actuators 16, 18 and 20 arranged around an equilateral triangle EFJ in the simulator operating plane 12. Referring to FIG. 3 the A frame ABD is mounted on the base plane 14 so that the pivoted arms AB lie parallel in the base plane to the pitch axis of the simulator operating plane. This in turn is parallel to the line EF joining the two outboard pivotal points of the actuators 18 and 20 between the points CE and CF.

The point C in the base plane 14 which is the lower end of each of the actuators 16, 18 and 20 is arranged to be equidistant from the points B and A. The line JD in the simulator operating plane 12 is parallel to this line and represents the roll axis of the simulator.

By fixing the length of the actuator 16, the simulator operating plane may be rotated about the axis JD by differential movements of the actuators 18 and 20. If actuators 18 and 20 are held constant or are moved in the opposite sense to an extension of retraction of the actuator 16, then the simulator will be moved in a pitching motion. Finally, if actuators 16, 18 and 20 are simultaneously extended or retracted by equal amounts, the simulator operating plane 12 will be raised or lowered relative to the base plane 14, this being the heave axis for the simulator plane.

Figure 7:
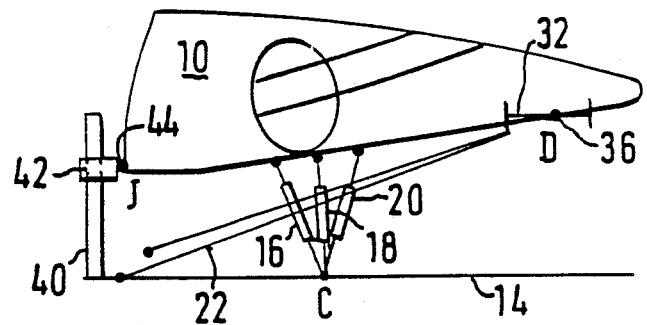

The heave movement will be accompanied by a small translational movement along the line JD caused by the rotation of the A frame 22 about the axis AB. This movement is generally acceptable providing that the dimensions of the A frame are sufficiently large with respect to the extended actuators 16, 18 and 20. In the alternative, as is shown in FIG. 7, the apex of the A frame 22 may be mounted on a slide 32 through the pivotal point D. Thus the pivotal point D may slide along the slide 32 to take up the translational movement along the line JD referred to above. The slide 32 may be of any suitable construction such as a rod 34 having a sliding bearing 36 which comprises the pivoal wall point D.

The yaw of the simulator plane about an axis parallel to the line joining the centre of mass and the pivotal point C is prevented by the resistance to distortion of the A frames 22 and 24. In the same way surge motion of the simulator capsule parallel to the line JD is prevented because the points E and F to which the actuator rams 26, 28 and 30 are pivoted, are constrained to pivot about the point C according to the different lengths of the extendible actuators at any particular moment. However point D is coupled to the points J, F, and E by the simulator capsule 10 through the simulator operating plane 12. Thus is is constrained by the A frame 22 to rotate about the line AB. Since simultaneous rotation about more than two points in a plane is impossile, surge motion is prevented.

Sway motion along a line parallel to EF is prevented in a similar fashion because the points E, F and JG are again constrained to rotate about the point C by the extendible actuators 16, 18 and 20. Any sway motion demanding a lateral translation of the point D will be resisted by the A frame 22.

The additional A frame 24 has a similar effect acting through the pivotal axis HI and point J.

Various other restraint mechanisms are envisaged as shown in FIGS. 6 to 10.

Figure 6:
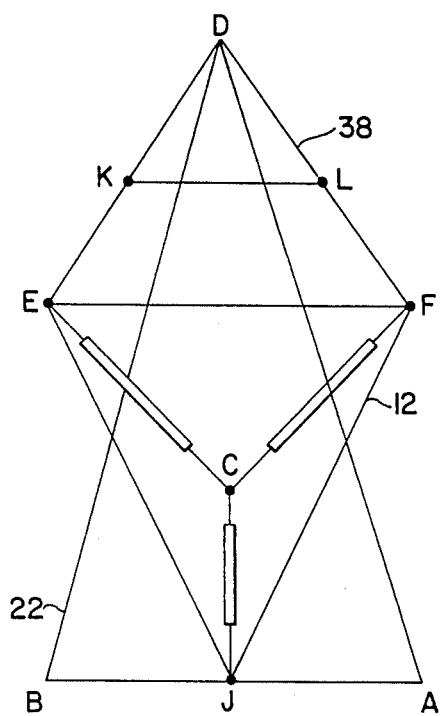
FIG. 6 shows an alternative arrangement of the actuators in one plane.

FIG. 6 shows a diagrammatic plan view of the present invention showing the actuators 16, 18 and 20 connected through point C about a universal joint. Point C is connected through extendible rams 26, 28, and 30 to points E, F, and G arranged in an equilateral triangle. Points E, F, and J lie in a simulator operating plane as shown in FIG. 2 and upon which the simulator capsule 10 is mounted. An A frame 22 is included which is pivoted about an axis AB, the axis AB lying in the base plane 14, again as shown in FIG. 2. The apex of the A frame 22 at point D is attached to the simulator capsule again in the simulator operating plane. However instead of a second A frame a hinged frame 38 is provided, extending from point D in the base plane 14 [as shown in FIG. 2] to the pivotal points E and F but having a hinged axis KL. As the simulator capsule 10 dips the hinge frame bends along axis KL.

FIG. 7 shows the A frame 22 acting as one restraint. The apex of the A frame 22 may be mounted on a slide 32 through the pivotal point D as previously described. An additional restraint in the form of a pillar 40 having a sliding bearing 42 is also provided. The pillar 40 in conjunction with the sliding bearing 42 allows the simulator capsule 10 to rise and lower without constraint. The sliding bearing 42 is pivotally attached to the simulator capsule 10 at point J through a universal joint 44. By this means, rotational movement induced by the actuators 16 and 20 can be accommodated without allowing the unwanted yaw, surge, and sway.

Figure 8:
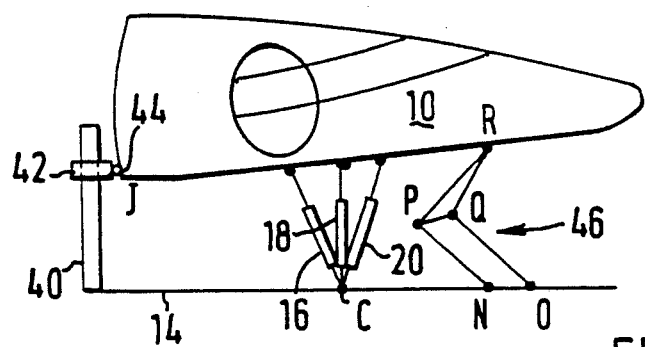

FIG. 8 shows a further arrangement of the pillar 40, the sliding bearing 42 attached to point J by a universal joint 44. Actuators 16, 18 and 20 are attached to the base plane 14 through point C and to the capsule simulator 10 in the simulator operating plane. A hinged frame 46 is attached to the base plane 14 through points N and O and has the hinge joint PQ and an apex R attached to the simulator 10. Once again the combination of the restraints prevents the unwanted rotational motion.

Figure 9:
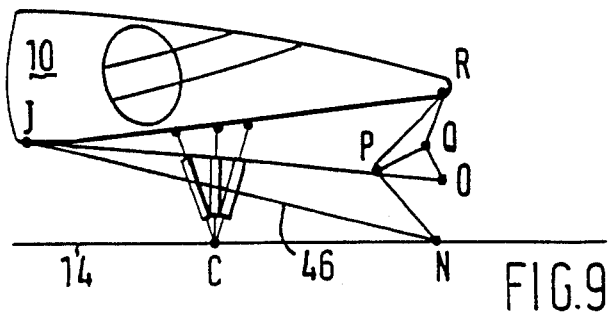

A further alternative restraint system is shown in FIG. 9 which has an A frame 48 attached to points N and O lying in the base plane 14 attached to pint M through the apex of the A frame 46. Once again unwanted rotational movements in the yaw, surge and sway axes are prevented.

FIG. 10 shows the restraint system in the form of two interlocking T bars instead of A frames. As already described, a capsule operating plane 12 has two triangular frames generally designated as DEFJ. A base plane 14 has a rectangular base, the outer extremities being according to the rectangle ABHI. Actuators 16 and 18 [the third actuator 20 being not shown, for clarity] are attached to single locating point C to points J and E respectively. A third actuator would extend from C to F. Restraining frames 102 and 104 which ahve the same effect as A frames are pivoted at points A and B and H and I respectively but effectively form a restraining T bar 102 and 104. They are connected to the simulator operating plane 12 through points J and D which are universal joints. The T frame 102 which connects the triangle ABD has further supporting bars 106 and 108 and dual central bars 110 and 112. The central bars 110 and 112 are spaced apart to allow actuator 16 to extend from point C to point J as shown in FIG. 10. They also allow the extended bar forming the equivalent to an A frame joining points HIJ to pass through bars 110 and 112. Actuators 16, 18 and 20 are connected to point C through universal joints. Although point C is substantially a single point, clearly the connecting points of the actuators 16, 18 and 20 need to be kept apart to prevent interference by the actuators to one or other of the actuators. However, the point C is constructed so that the three actuators 16, 18 and 20 extend substantially from a single point. A connecting base plate may also be included if desired to form the point C.

A slide 114 is provided upon which universal joint 116 is connected to point D. Universal joint 116 has a sliding bearing 118 which allows horizontal movement in the surge [su] axis. Although sliding bearing 118 and slide 114 are shown on frame 102, it can be mounted on frame 104, but not both fames at the same time. As an alternative to the slide, frame 102 or 104 may be telescopic such that surge motion is taken up by extension or contradiction of the telescopic arm.

In operation, the actuators 16, 18, and 20 are contracted such that the simulator operating plane is lowered as far as possible. This causes the T bars 104 and 102 to lower, pivoted from axes A and B and H and I respectively.

When the actuaotrs 16, 18 and 20 extend, the frames 102 and 104 are raised again along the pivoted axes AB and HI respectively, the simulator operating plane being adjusted in height and position according to the amount of extension of the actuators.

As previously described, the actuators 16, 18 and 20 may be hydraulic rams operated by external control means.

Other restraint mechanisms are also possible. It is also possible to combine the various restraint mechanisms described in ways other than those described in order to restrain the capsule 10 in unwanted yaw, surge and sway axes.

I claim:

1. A simulator mechanism capable of operating in three degrees of freedom, including a base having a fixed plane, a simulator operating plane and three independent extendible actuators capable of changing the operating plane, characterized in that:

the three actuators are pivotally coupled with universal freedom at a generally single on the base plane, said single point comprising closely aligned connection points for the three actuators; each actuators is pivotally coupled at a spaced apart point on the simulator operating plane.

2. A simulator mechanism as claimed in claim 1 wherein the simulator operating plane has a simulator capsule attached thereto.

3. A simulator mechanism as claimed in claims 1 or 2 wherein the actuators are coupled to operate in heave, about the pitch and roll axes and where the mechanism has restraining means to prevent unwanted motion in yaw, surge and sway axes.

4. A simulator mechanism as claimed in claim 3 wherein the restraining means are A-frames or equivalents thereto having pivotal axes parallel and horizontal.

5. A simulator mechanism as claimed in claim 3 wherein there are two restraining means.

6. A simulator mechanism as claimed in claim 5 wherein one of the two restraining means is attached via a sliding bearing to the simulator operating plane, the direction of the slide being along the surge axis.

7. A simulator mechanism as claimed in claim 4 wherein the actuators are hydraulic rams having extendible pistons, pneumatic rams having extendible pistons, electric actuators, a rack and pinion operated by electric motor or a ball and nut operable on a rotatable screw rod.

8. A simulator mechanism as claimed in claim 7 wherein the actuator is a hydraulic ram.

* * * * *